United States Patent Office 3,251,699
Patented May 17, 1966

3,251,699
BAUXITE BRICK
Harlan Dale Smith and William Russell Weiss, Wellsville, Mo., assignors to Wellsville Fire Brick Company, Wellsville, Mo., a corporation of Missouri
No Drawing. Filed Feb. 24, 1965, Ser. No. 435,029
2 Claims. (Cl. 106—65)

This application is a continuation-in-part of copending application Serial No. 163,895, filed January 2, 1962, now U.S. Patent No. 3,202,735.

The present invention relates to a stable refractory material, and more particularly to a novel high-alumina brick and the process for making said brick.

Conventional high-alumina refractory brick are manufactured in several grades which vary in alumina content from 50 to 90 percent, and consist of a dead burned bauxite grog bonded by a clay matrix. This matrix or bonding material constitutes the major portion of the surface area of the brick prior to burning.

The prior art on the manufacture of such brick includes combining of the proper grain sizes of a dead burned bauxite and suitable clays, and then power pressed to approximately 4000 p.s.i. using in the region of 7 to 8 percent moisture. These bricks are then fired to Cone 12 to 14 and are then available for commercial use. There are several drawbacks to the use of such brick in the field, one being a 4 to 6 percent expansion when heated to approximately 2910° F. Another drawback is a porosity of 22 to 28 percent, which high porosity results in premature failures of the brick in service because it allows both gas and slag penetration. Also, the bricks have poor spalling resistance.

Bauxite as it is usually found in nature is composed primarily of hydrated alumina or aluminum hydroxide, the amount of aluminum oxide ranging from 50 to 60 percent. This aluminum oxide is combined with relatively smaller amounts of iron oxide (¼ to 5 percent), silica (3 to 15 percent), titanium oxide (1½ to 5 percent) and the residue being combined water. Upon calcining or igniting, it is possible to remove this combined water with an ignition loss varying from 25 to 33 percent. The dead burned bauxites available from British Guiana or other sources, although high fired, are, as aggregate, extremely unstable with volume expansion and increasing porosity when put in service.

An important object of the present invention is to produce a stable high-alumina brick containing 60 percent or more aluminum oxide.

Another object of the present invention is the provision of a three-stage method of manufacture to provide a brick of greater stability, greater density and lower porosity than has been hitherto available in the refractory market.

A further object of the present invention is the provision of a halogen containing flux to stabilize the bauxite brick. To properly stabilize the bauxite, the following conditions must be met: high surface softening of the bauxite grains in the presence of a gaseous component capable of reacting with alumina silicate at high temperatures in the range of 2300 to 2800° F. The present invention is confined to the treatment of dead burned bauxite with the metal salts and compounds of the halogen group; namely, fluorine, chlorine, bromine and iodine. As the atomic weights of the halogens increase, the oxidizing power decreases so that fluorine or chlorine are preferred in the flux due to their higher oxidizing potential.

The present invention also provides for a reaction in the three-stage process to form a stable aggregate which appears to take no further reaction on reheating to 2910° F.

Further objects will become apparent to those skilled in the art upon consideration of the following description and as particularly defined by the accompanying claims.

The process of the invention in its broad aspect comprises the steps of crushing dead burned bauxite, mixing with clay and a flux, pressing the mixture and firing, crushing the fired product, adding more clay, and extruding and drying the mixture, crushing and grinding the extruded shapes, tempering and pressing the ground material to the final shape, and drying and firing the resulting brick.

In accordance with the present invention, the first stage of the three-stage process involves the addition of halogen containing additives to dead burned bauxite, crushing and pressing. The second stage involves further crushing and mixing with further additives under a vacuum, and extruding dobie shapes which are then dried. The third stage involves additional crushing and grinding, addition of water and power pressing into the final forms which are then dried and fired.

The raw material utilized in the preparation of the high-aluminia refractory brick is bauxite in a dead burned state such as available from British Guiana and other sources. The bauxite as mined contains ($Al_2O_3 \cdot 2H_2O$) or ($Al_2O_3 \cdot H_2O$) plus 1 to 5 percent by weight iron oxides and 1 to 41 percent by weight silica as $SiO_2$ with the silica content generally in the range of 1 to 14 percent. These aggregates, although highly fired (approximately 3000° F.) prove to be extremely unstable with volume expansion and porosity when put into service.

In the first stage of the novel process, the dead burned bauxite is crushed to pass through a 6 mesh screen. Then approximately 1–5 percent by weight of a sodium halide, for example, sodium chloride or aluminum wastes containing halides are added along with approximately 10 to 30 percent by weight of wet refractory clay

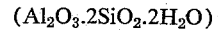
($Al_2O_3 \cdot 2SiO_2 \cdot 2H_2O$)

so that the mixture can be power pressed into suitable dobies. These dobies are then fired in a suitable tunnel kiln to a temperature of approximately 2300° F. to 2800° F., depending upon the types and percentages of additives used.

Due to the high migratory properties of the fluxes and the volatility characteristics of their gases, excessive scumming and fluxing reactions are found to occur on the surface of the brick. In fact, the surface appearance of these dobie bricks in the first stage of the process may be so undesirable that it is often advisable to remove the scum and remake the bricks after the migrating chemicals have been combined with the aluminum silicates in the bauxite to form insoluble compounds.

By using the halide fluxes in a three-stage process, several reactions are obtained which cannot be successfully obtained in a single step process such as described in the prior art, even though the undesirable scumming occurs. First, sufficient fluxing is available during the first stage to attack and soften the surface of the grains of the crushed dead burned bauxite. The gaseous reaction of the flux material is confined in the dobie shape sufficiently to greatly reduce the viscosity of the softened surface of the bauxite grains. The softening and decrease in viscosity of the surface of the bauxite grains allows for a very rapid reaction of the alumina and silica to combine and form a stable mullite ($3Al_2O_3.2SiO_2$) which appears to take no further reaction on reheating to approximately 2910° F.

With these stabilized bauxitic grains in the dobie bricks, the further process to make a finished refractory brick may now proceed. The treatment of the bauxite with the flux in the first stage stabilizes it against expansion upon reheating to elevated temperatures. Although this stabilization occurs in the first stage, it is maintained throughout the balance of the process.

The second stage of the present invention involves the crushing of the dobie bricks to pass through an approximately 8 mesh screen. This crushed material is then mixed with fused or calcined alumina to control the alumina content of the bricks, a small percentage of cullet, opproximately 3 percent by weight, which greatly improves the final bonding strength, a wetting agent, and sufficient wet refractory clay binder to provide an adhesive mass for an extrusion operation. This mixture is mixed under a vacuum of approximately 27 to 29 inches of mercury to secure intimate and complete coating of the bauxite particles with the clay bonding medium. It has been found that by coating the bauxite particles in this manner that the overall porosity of the final brick is reduced to approximately 12 to 16 percent rather than the commercially available brick which has a porosity of from approximately 22 to 28 percent. This mixture is then extruded into suitable dobie shapes and dried in a conventional dryer.

The third stage of the present invention involves the crushing of the extruded dobie shapes, grinding the crushed particles to a size which will pass through a 4 mesh screen. The particles are tempered with sufficient water for pressing and then the particles are power pressed at approximately 4000 p.s.i. to form the final refractory brick. This brick is then dried and fired to a temperature of approximately 2550° F. (Cone 14) in the customary manner.

The following example illustrates the brick of this invention and the process of making it;

*Example I.—Process No. 1*

In the first stage of the process 900 pounds of dead burned bauxite was subdivided to —1/16 mesh, mixed with 20 pounds of sodium fluoride, 100 pounds of West Missouri clay and 20 pounds of bentonite, the mixture pressed at about 4000 pounds per sq. in. to form dobies and the dobies fired at 2500° F.

In the second stage the fired dobies of stage 1 were crushed into —1/16 mesh particles which were mixed under vacuum of 28 inches of mercury with 200 pounds of fused alumina, 30 pounds of cullet, and 200 pounds of West Missouri clay, the mixture then extruded into large dobies and dried at 300° F.

In the third stage the dobies of stage 2 were crushed to particles of —4 mesh, 6 pounds of water was added to the crushed mixture to moisten it, and the mixture was then power pressed at approximately 8000 pounds per sq. in. into bricks which were then dried at 300° F., and fired at 2550° F.

Samples of brick made by the above Process No. 1 were tested with the following results:

| Test ran: | Process No. 1 |
|---|---|
| Modulus of Rupture, p.s.i. | 3940 |
| Weight/cu. ft. | 166.9 |
| Apparent porosity, percent | 12.1 |

A representative chemical analysis of the final refractory brick together with a suitable range are shown in the following table:

TABLE I

| | Amount, percent | Range, percent |
|---|---|---|
| Silica as $SiO_2$ | 18.8 | 10–30 |
| Alumina as $Al_2O_3$ | 75.4 | 60–80 |
| Iron as $Fe_2O_3$ | 2.0 | 0–5 |
| Titania as $TiO_2$ | 2.2 | 0–5 |
| Lime as CaO | 0.3 | 0–1 |
| Magnesia as MgO | 0.2 | 0–1 |
| Alkalis as $Na_2O+K_2O$ | 0.9 | 0–2 |

Several features of this final brick obtained from the three-stage process are believed to be of particular importance. The linear expansion upon reheating carried out according to ASTM test C–113, Schedule C showed a value of not substantially greater than .7 percent and a representative value of +0.5 percent. Further, as previously stated, a representative porosity of the brick is approximately 14 percent, range 12–16 percent; these values determined under ASTM test C–20. Other important properties are the bulk density of the brick which is a representative value of approximately 165 (163–168) pounds per cubic foot with a representative modulus of rupture of 2600 p.s.i. (ranging from 2500 p.s.i. to 4000 p.s.i.) and a cold crushing strength above 10,000 p.s.i.; values substantially higher than that of the presently available commercial bricks.

Thus, we have invented a novel refractory brick from available dead burned bauxite having a reduced porosity, a substantially lower expansion on reheating and an improved intimacy of the bond between the particles to give a substantially improved product. The lower porosity makes the brick much more resistant to deteriorating furnace conditions.

The mesh screen sizes as set forth in this specification refer to meshes per lineal inch for Typer standard screen scale sieves.

While we have shown and described certain specific embodiments of our invention, we do not wish to be limited thereto since various modifications may be made without departing from the scope of the claims.

We claim:

1. A stable refractory bauxite brick consisting essentially of particles of a major amount of dead burned bauxite and fused alumina, and bonded with clay and glass cullet, said brick having an alumina content of 60 to 80 percent by weight, a silica content of 10 to 30 percent by weight, iron as $Fe_2O_3$ up to 5 percent by weight, titania as $TiO_2$ up to 5 percent by weight, lime as CaO up to 1 percent by weight, magnesia as MgO up to 1 percent by weight, and alkalis as $Na_2O$ and $K_2O$ up to 2 percent by weight and further characterized by having a porosity of approximately 12 to 16 percent, and a dimensional stability up to a temperature of 3000 F. as shown by linear expansion on reheating of not substantially greater than .7 percent.

2. The stable refractory bauxite brick of claim 1 having approximately the following chemical analysis in percent by weight:

| | Percent |
|---|---|
| Silica as $SiO_2$ | 18.8 |
| Alumina as $Al_2O_3$ | 75.4 |
| Iron as $Fe_2O_3$ | 2.0 |
| Titania as $TiO_2$ | 2.2 |
| Lime as CaO | 0.3 |
| Magnesia as MgO | 0.2 |
| Alkalis as $Na_2O$ and $K_2O$ | 0.9 |

References Cited by the Examiner

UNITED STATES PATENTS 1,893,313   1/1933   Willetts _____ 106—67
1,942,431   1/1934   Jung _____ 160—67

TOBIAS E. LEVOW, *Primary Examiner.*

J. E. POER, *Assistant Examiner.*